United States Patent [19]
Masumoto

[11] Patent Number: 5,418,583
[45] Date of Patent: May 23, 1995

[54] OPTICAL ILLUMINATION SYSTEM AND PROJECTION DISPLAY APPARATUS USING THE SAME

[75] Inventor: Yoshihiro Masumoto, Kobe, Japan

[73] Assignee: Matsushita Electric Industrial Co., Ltd., Osaka, Japan

[21] Appl. No.: 39,770

[22] Filed: Mar. 30, 1993

[30] Foreign Application Priority Data

Mar. 31, 1992 [JP] Japan .................................. 4-076694
Nov. 20, 1992 [JP] Japan .................................. 4-0311736

[51] Int. Cl.⁶ .............................................. G03B 21/14
[52] U.S. Cl. ...................................... 353/38; 353/102; 362/268; 362/309
[58] Field of Search ........................ 353/38, 31, 33, 34, 353/37, 69, 102; 362/309, 331, 333, 268; 359/48, 49

[56] References Cited

U.S. PATENT DOCUMENTS

| | | | |
|---|---|---|---|
| 4,457,600 | 7/1984 | Hall | 353/122 |
| 4,497,015 | 1/1985 | Konno et al. | 353/38 |
| 4,547,037 | 10/1985 | Case . | |
| 4,619,508 | 10/1986 | Shiboya et al. | 353/38 |
| 4,769,750 | 9/1988 | Matsumoto et al. | 362/268 |
| 4,769,750 | 9/1988 | Matsumoto et al. . | |
| 4,939,630 | 7/1990 | Kikuchi et al. | 362/268 |
| 4,988,188 | 1/1991 | Ohta | 353/122 |
| 5,098,184 | 3/1992 | van den Brandt et al. . | |

FOREIGN PATENT DOCUMENTS

| | | |
|---|---|---|
| 0180800 | 5/1986 | European Pat. Off. . |
| 0395156 | 10/1990 | European Pat. Off. . |
| 43-5089 | 2/1968 | Japan . |
| 3-111806 | 5/1991 | Japan . |

OTHER PUBLICATIONS

Patent Abstracts of Japan, vol. 005127, Aug. 15, 1981, for JP 56-064837.
Kazuhiko Takeuchi et al., "A 750-TV-Line-Resolution Projector Using 1.5-Megapixel a-Si TFT LC Modules", SID 91 Digest, pp. 415-418.

Primary Examiner—William A. Cuchlinski, Jr.
Assistant Examiner—William C. Dowling
Attorney, Agent, or Firm—Wenderoth, Lind & Ponack

[57] ABSTRACT

An optical illumination system includes a radiation source, a condensor, a first lens array including a plurality of first lenses, and a second lens array including a plurality of second lenses. The first lens array converges partial luminous fluxes, the number of which is the same as the number of first lenses, onto the second lenses paired with the first lenses. The second lens array transmits each of the partial luminous fluxes to an object region to be illuminated in such a manner that the partial luminous fluxes are superimposed on each other at the object region. Configurations of the apertures of the second lenses are different from each other and the second lenses are arranged in close contact with each other with the effective region of the second lens array approximating the smallest possible circle.

18 Claims, 18 Drawing Sheets

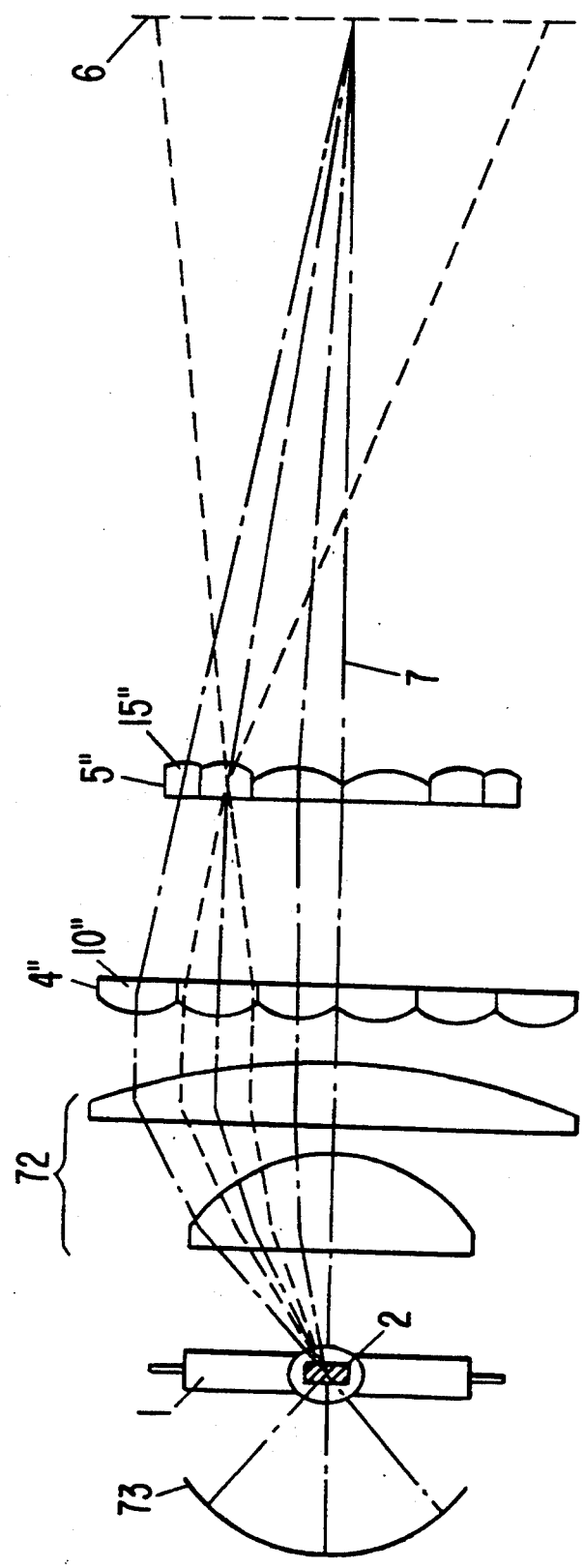

OPTICAL ILLUMINATION SYSTEM AND PROJECTION DISPLAY APPARATUS USING THE SAME

BACKGROUND OF THE INVENTION

1. Field of the Invention

The present invention relates to an optical illumination system to be used mainly to illuminate a light modulator. The present invention also relates to a projection display apparatus for illuminating the light modulator and for projecting an enlargement of an optical image, which has been formed on the light modulator, onto a screen.

2. Description of the Prior Art

An optical illumination system using a light modulator is known as a means for displaying an image on a large screen. Specifically, a projection display apparatus using a liquid crystal panel has been developed in recent years. An example of such a projection display apparatus is described in SID' 91 Digest, page 415 through page 418.

It is necessary to provide such a projection display apparatus with an optical illumination system which illuminates an optical image formed on a light modulator with a strong light. The quality of the optical image projected onto the screen depends greatly on the performance of the optical illumination system. Accordingly, there is a growing demand for the development of an optical illumination system providing luminous flux which has good color reproducing property, good uniformity of brightness, and good uniformity of color, with high efficiency.

An optical illumination conventionally uses a concave mirror. FIG. 18 shows an example of this type of optical illumination system comprising a lamp 201 and a concave mirror 202. The concave mirror 202 consisting of a parabolic mirror condenses most of the beams of light radiating from a radiation source 203 and forms illuminating beams 205 substantially parallel to an optical axis 204, thus illuminating an object region 206.

A metal halide lamp, a xenon lamp or a halogen lamp is used as the lamp 201. The metal halide lamp is superior to the xenon lamp and the halogen lamp in luminous efficacy and color reproduction properties. The concave mirror 202 may be an ellipsoidal mirror.

In the optical illumination system using the concave mirror, the concave mirror condenses illuminating beams with a high efficiency, but since the luminous density in the vicinity of the optical axis 204 is high, the brightness of the image displayed at the object region 206 is nonuniform. The tube surface of the lamp 201 has been frosted to improve the uniformity of brightness and color of the image at the object region 206. However, a frosted tube diffuses beams and as a result, the object region 206 has a very low brightness.

An optical integrator has been used to improve the uniformity of brightness and color of illuminating light. Such an optical integrator, which uses lens arrays, is disclosed in examined Japanese Patent Publication No. 43-5089 and U.S. Pat. No. 5,098,184. FIG. 19 shows an example of an optical illumination system comprising the optical integrator.

The optical illumination system shown in FIG. 19 includes a first lens array plate 221, a second lens array plate 222, and a third lens 223 in addition to the components of the optical illumination system using the concave mirror as shown in FIG. 18. The first lens array plate 221 and the second lens array plate 222 comprise a plurality of first lenses 224 and a plurality of second lenses 225 arrayed two-dimensionally, respectively. The first lens array plate 221 divides a single luminous flux, having a great brightness nonuniformity, into the same number of partial luminous fluxes as the number of first lenses 224. The degree of the nonuniform brightness of each partial luminous flux is smaller than the degree of the nonuniform brightness of the single luminous flux. The partial luminous fluxes are effectively transmitted toward the object region 206 by the second lens array plate 222 and are superimposed on each other by the third lens 223. In this manner, illumination having a high degree of brightness uniformity can be obtained.

The conventional optical illumination system as shown in FIG. 19 has, however, a low efficiency of light in action when the illuminating angle of illuminating light is limited to a certain range although the optical illumination system can form an image having a high degree of brightness uniformity. The illuminating angle means the maximum of all of the angles formed between the beams, which illuminate the object region, with the main optical axis of the optical illumination system. This disadvantage is conspicuous if the optical illumination system has a large radiation source. The reason for this is as follows.

Most of the beams emitted by the lamp 201 are reflected by the concave mirror 202 and incide on the first lens array plate 221, thus reaching the second lens array plate 222. Accordingly, if there is no loss of light at the second lens array plate 222, most of the beams radiating from the lamp 201 reach the object region 206. That is, the efficiency of light in action of the entire illuminating optical system depends mainly on the optical loss at the second lens array plate 222.

A plurality of real images of the radiation source 203 are formed on the second lens array plate 222 via the concave mirror 202 and the first lens array plate 224. If a real image larger than the area of the aperture of the second lens 225 is formed thereon, some beams are not effectively transmitted to the object region 206 and an optical loss occurs. That is, the efficiency of light in action of the optical illumination system is lowered.

The size of the real image formed on the second lens array plate 222 is determined by the size of the radiation source 203. Therefore, preferably, a lamp comprising a small radiation source is used in view of the efficiency of light in action of the optical illumination system. However, in the case of a short arc type of metal halide lamp, the wattage of which is 150 W to 250 W, the length of the radiation source is as short as 5 mm to 10 mm. As a result, the emission characteristic of the lamp is extremely poor or the life thereof is short. The same is true with respect to a halogen lamp.

Only the second lens array plate could be enlarged to reduce optical loss without the need to otherwise alter the structure of the optical system. In this case, however, the illuminating angle would be large, and the optical illumination system would have the following problems.

A large illuminating angle requires the use of a projection lens having a small f-number. The projection lens has, however, a large effective diameter and is expensive. It is, therefore, difficult to provide a compact optical projection apparatus.

The optical characteristic of the conventional display changes according to the incident angle of the light. For example, the contrast of an image projected onto a screen from a liquid crystal panel display becomes poorer with increases in the illuminating angle. Therefore, the f-number of the projection lens which can be used is limited.

SUMMARY OF THE INVENTION

It is an object of the present invention to provide an optical illumination system which provides a high degree of brightness uniformity and which can transmit illuminating light at a small angle to the optical axis thereof with a high efficiency of light in action.

It is another object of the present invention to provide a compact projection display apparatus, using an optical illumination system, which can display a bright image with a high degree of brightness uniformity on a screen.

In accomplishing these and other objects of the present invention, there is provided an optical illumination system comprising: a radiation source; a condensing means for converting beams of light radiating from the radiation source into a single luminous flux; a first lens array comprising a plurality of first lenses disposed in a two-dimensional array; and a second lens array comprising a plurality of second lenses, paired with each of the first lenses, and disposed in a two-dimensional array, and in which the first lens array divides the single luminous flux into a plurality of partial luminous fluxes of the same number at that of the number of first lenses, and each of the first lenses converges each of the partial luminous fluxes onto apertures of the second lenses paired therewith, respectively, each of the second lenses magnifies each of the partial luminous fluxes and superimposes each of the partial luminous fluxes onto an object finite region, each of the second lenses has an aperture larger than the cross sections of the partial luminous fluxes reaching the second lenses, respectively, at least some of the plurality of the second lenses have apertures of differing configurations, and the effective region of the second lens array formed by the apertures of the second lenses approximately inscribes a circle.

According to the above system, the single luminous flux which has propagated from the condensing means and has been incident on the first lens array is divided into a plurality of partial luminous fluxes, the number of which is equal to the number of the first lenses. The degree of the brightness uniformity of each of the partial luminous fluxes is higher than that of the single luminous flux.

Each partial luminous fluxes which has been transmitted from each of the first lenses is incident on the second lens of the second lens array paired therewith. The second lens array transmits the partial luminous fluxes to the object region to be illuminated, thus superimposing the partial luminous fluxes on each other. In this manner, the optical illumination system provides illuminating light having a high degree of brightness uniformity. The apertures of some of the second lenses are effectively different from each other. The distance between the center of the aperture of each of first lens and the condensing means is the height of the first lens. The apertures of those second lenses paired with first lenses, the height of which are great, are relatively small. In addition, the second lenses are arranged in close contact with each other so that the configuration of the overall aperture of the second lens array approximates the smallest possible circle. In this manner, each of the second lenses has an aperture sufficient to receive the partial luminous flux from the first lens paired therewith, while the sum of the areas of the aperture of the second lenses can be kept small. The optical illumination system according to the present invention utilizes beams radiating from the light source with a high efficiency, thus providing illuminating light which is uniformly bright to a high extent and which forms a small angle with the main optical axis. The projection display apparatus is compact and can provide not only a bright image, but also an image uniformly bright to a high extent.

BRIEF DESCRIPTION OF THE DRAWINGS

These and other objects and features of the present invention will become clear from the following description of the preferred embodiments thereof made with reference to the accompanying drawings, in which:

FIG. 10 is a schematic diagram of still another embodiment of an optical illumination system according to the present invention;

FIG. 11a is a plan view of the lens array plate; FIG. 11b is a sectional view thereof taken along line 11b—11b of FIG. 11a; and FIG. 11c is a sectional view thereof taken along line 11c—11c of FIG. 11a;

DETAILED DESCRIPTION OF THE PREFERRED EMBODIMENTS

Figure 1:
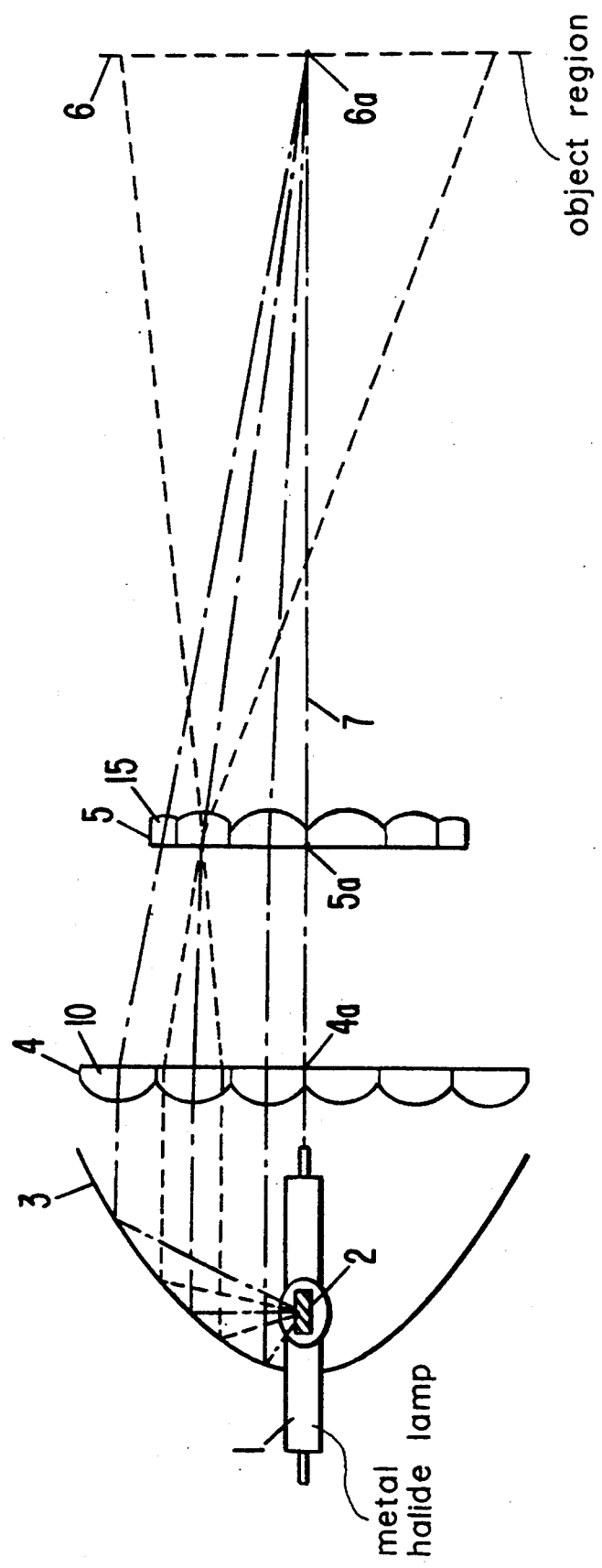
FIG. 1 is a schematic diagram of an embodiment of an optical illumination system according to the present invention.

Before the description of the present invention proceeds, it is to be noted that like parts are designated by like reference numerals throughout the accompanying drawings.

FIG. 1 shows a first embodiment of an optical illumination system according to the present invention. The optical illumination system comprises a metal halide lamp 1, a radiation source 2, a parabolic mirror 3, a first lens array plate 4, a second lens array plate 5, and an object region 6 to be illuminated. The main optical axis 7 of the optical illumination system is coincident with the axis of symmetry of the parabolic mirror 3. The main optical axis 7 passes through the center of the effective region of the first lens array plate 4 and the center of the effective region of the second lens array plate 5 and ends at the center 6a of the object region 6 to be illuminated. The object region 6 is located at the effective display area of a light modulator, such as a liquid crystal panel.

The metal halide lamp 1 comprises a radiation source 2. The radiation source 2 is approximately cylindrical. The major axis of the radiation source 2 and the main optical axis 7 coincide with each other and the center of gravity of the radiation source 2 is disposed in the vicinity of the focal point of the parabolic mirror 3. Accordingly, beam substantially parallel with the main optical axis 7 are incident on the first lens array plate 4. More specifically, beams radiating from the focal point of the parabolic mirror 3 and reflected in a direction parallel to the main optical axis 7 are incident on the first lens array plate 4.

Figure 2:
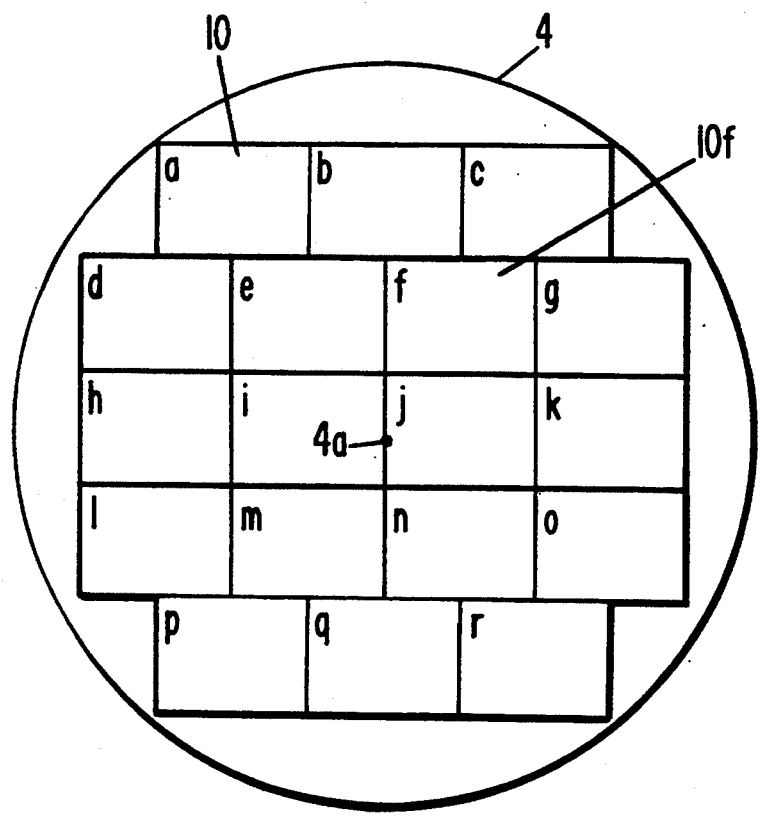
FIG. 2 is a plan view showing a first lens array plate of the present invention.

FIG. 2 shows an example of the first lens array plate 4. The plate 4 comprises eighteen first lenses 10 having apertures each having a shape similar to that of the rectangular object region 6. The reference symbols (a) through (r) correspond to each of the symbols (a') through (r') used to designate the second lenses constituting the second lens array plate 5 which is described later. The first lenses 109 are all plano-convex lenses and the convex surfaces thereof are opposed to the parabolic mirror 3.

The apertures of the first lenses 10 are all rectangular and the aspect ratio thereof is set to 4:3 supposing that the optical illumination system illuminates a liquid crystal panel on which a TV image of an NTSC system is displayed. In conformity with the sectional configuration of a luminous flux reflecting from the parabolic mirror 3, the first lenses 10 are arranged so that the configuration of the overall aperture of the first lenses 10, closely contacting each other, is approximately circular. The center 4a of the effective region of the first lens array plate 4 is the center of a circle circumscribed about the eighteen first lenses 10. The main optical axis 7 passes through the center 4a. The ratio of the area of the object region 6 to the area of the overall aperture of the first lenses 10 is defined as the magnification (M) of the second lenses 15. The definition applies to all embodiments which will be described below.

Figure 3:
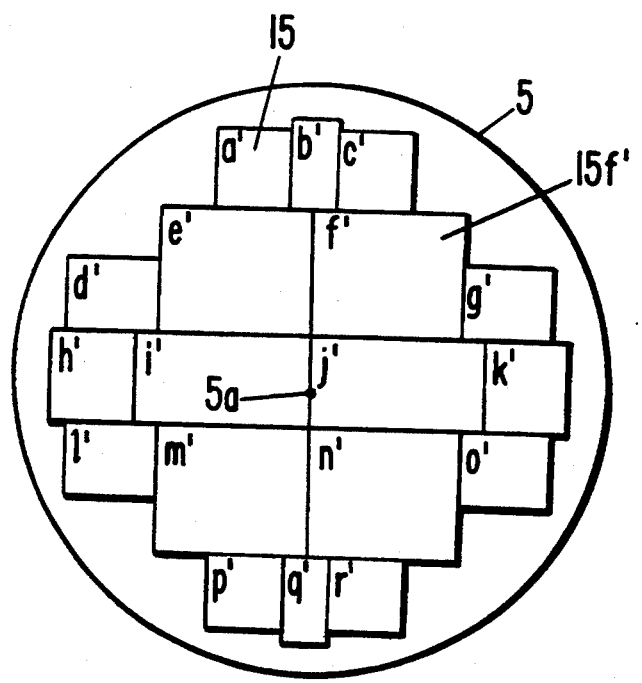
FIG. 3 is a plan view of a second lens array plate of the present invention.

FIG. 3 shows the second lens array plate 5. The second lens array plate 5 comprises eighteen second lenses 15 arranged in close contact with each other in correspondence with each of the first lenses 10. The second lenses 15 are all plano-convex lenses and the convex surfaces thereof are opposed to the object region 6.

The function of the optical illumination system, having the above-described structure, will be described below. The parabolic mirror 3 condenses beams of light radiated by the radiation source 2, thus forming a single luminous flux which travels along the main optical axis 7. A portion of the single luminous flux in the vicinity of the main optical axis 7 has a higher luminous density and a greater degree of brightness nonuniformity than a portion thereof more distant from the optical axis 7. The single luminous flux which has been incident on the first lens array plate 4 is divided into eighteen partial luminous fluxes by each of the eighteen first lenses 10. The degree of the brightness nonuniformity of each of the partial luminous fluxes is smaller than that of the single luminous flux. Each of the first lenses 10 guides a partial luminous flux which has been incident thereon to the aperture of a corresponding second lens 15 and converges the partial luminous flux to the greatest extent, i.e. to have the smallest spread in the vicinity of the aperture of each of the second lenses 15.

Each of the second lenses 15 enlarges the corresponding partial luminous flux which has been incident thereon into an appropriate size, and the enlarged partial luminous fluxes are superimposed on each other on the object region 6. More specifically, the partial luminous fluxes, each having a configuration corresponding to that of an aperture of a respective one of the first lenses 10, are enlarged to an extent corresponding to the magnification (M) of the second lenses 15 and guided to the object region 6 so that the partial luminous fluxes are superimposed on each other on the object region 6. Since the configuration of the overall aperture of the first lenses 10 is similar to that of the object region 6, the sectional configuration of illuminating light which illuminates the object region 6 coincides with that of the object region 6 and thus the optical illumination system has a high efficiency of light in action.

According to the optical illumination system of the present invention, the single luminous flux having a great degree of brightness nonuniformity is divided into partial luminous fluxes each having a low degree of brightness nonuniformity, and the partial luminous fluxes are superimposed on each other on the object region 6. Therefore, the optical illumination system provides illumination uniformly bright to a high extent. Also, the color unevenness of the illumination light is improved.

It is important to provide an optical illumination system having a high efficiency of light in action to obtain bright illuminating light without wastefully consuming electric power. Most of the beams emitted by the radiation source 2 are condensed by the parabolic mirror 3, incide on the first lens array plate 4, and then reach the second lens array plate 5. Accordingly, if optical loss is small at the second lens array plate 5, most of the beams emitted by the radiation source 2 arrive at the object region 6. In this respect, a very high efficiency of light in action can be achieved by making the sectional area of each second lens 15 larger than the sectional array of each partial luminous flux which passes therethrough.

The larger the sectional area of the aperture of each second lens 15, the greater the effective region of the second lens array plate 5 becomes and as a result, the larger the illuminating angle of the light which illuminates the object region 6 becomes. The illuminating angle refers to the maximum angle that any beam which illuminates the object region 6 makes with the main optical axis 7. That is, the f-number of the illuminating light becomes small. In the case of projecting an optical image, which is formed on the light modulator, onto the screen using a projecting lens, it is desirable for the f-number of the projecting lens to be smaller than that of the light illuminating the light modulator. If this is not so, it is impossible for the projecting lens to converge a part of light radiating from the light modulator, whereby a loss of light occurs resulting in that a bright projecting picture image cannot be obtained.

The aperture configuration of the second lenses 15 provide a high efficiency of light in action without greatly increasing the illuminating angle of the illuminating light.

The sectional areas of the partial luminous fluxes which become most convergent in the vicinity of the second lens array plate 5 are different from each other. Generally, the cross sections of partial luminous fluxes become larger the closer the partial luminous fluxes are to passing along the main optical axis 7. Accordingly, the aperture of each of the respective second lenses 15 has a sectional area adapted for the partial luminous flux incident thereon. Therefore, the sizes of the apertures are different from each other. The sectional area of each aperture may be greater than that required, in consideration of a positioning error which can occur when assembling the optical illuminating system.

In addition, the respective second lenses 15 are arranged in close contact with each other such that the effective region of the second lens array plate 5 approximates the smallest possible circle.

There is not a great amount of optical loss in each partial luminous flux passing through a respective one of the apertures of the second lenses 15 because the apertures have respective sectional areas appropriate for the partial luminous fluxes. In addition, since the effective region of the second lens array plate 5 is relatively small, illuminating light forms a small angle with the optical axis without a great optical loss. Accordingly, the optical illumination system of the present invention is capable of forming illuminating light which is uniformly bright to a high degree and forms a small illuminating angle, with a high efficiency of light in action.

Figure 4:
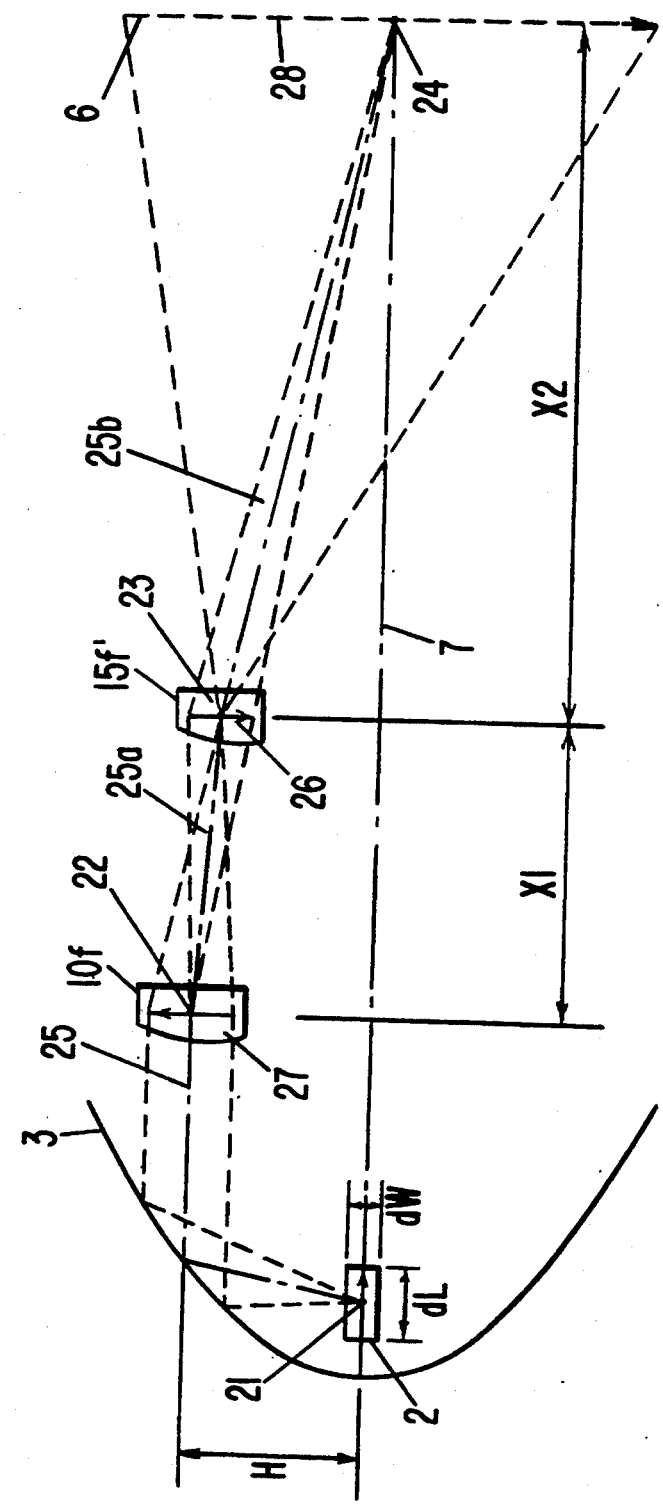
FIG. 4 is a schematic diagram of a portion of the optical illumination system according to the present invention, and illustrates the operation thereof.

An aperture of one of the second lenses 15 will be described in detail with reference to FIG. 4 showing the radiation source 2, the parabolic mirror 3, one 10f of the first lenses 10, the second lens 15f paired with the first lens 10f, and the object region 6.

suppose that the length (in the direction of the major axis) of the radiation source 2 is dL, the width (direction of the minor axis) thereof is dW, the focal length of the parabolic mirror 3 is P, the focal length of the first lens 10f is F1, the focal length of the second lens 15f is F2, the distance between the first lens 10f and the second lens 15f along the main optical axis 7 is X1, and the distance between the second lens 15f and the object region 6 along the main optical axis 7 is X2. The beams of light radiating from the focal point 21 of the parabolic mirror 3 include a beam passing through the aperture centers 22, 23 of the first lens 10f and the second lens 15f and reaching the center 24 of the region 6. The path of this beam is designated by reference number 25. The section of the light path 25 between the aperture centers 22, 23 of the first lens 10f and second lens 15f will be referred to as an auxiliary light axis 25a. Also, the section of the light path 25 between the aperture center 23 of the second lens 15f and the center 24 of the region 6 to be illuminated will be referred to as an auxiliary light axis 25b. The following angles are regarded as very slight: the angle formed between the auxiliary optical axis 25a and the main optical axis 7, and the angle formed between the auxiliary optical axis 25b and the main optical axis 7. The length of the auxiliary optical axis 25a and the length of the auxiliary optical axis 25b are regarded to be equal and will be referred to as the length X1 and the length X2, respectively.

The focal length F1 of the first lens 10f is equal to the length X1. Beams which have been radiated from the focal point 21 of the parabolic mirror 3 and have been incident on the first lens 10f after traveling parallel to the main optical axis 7 cross the auxiliary optical axis 25a at the second lens 15f. That is, the real image 26 from the radiation source 2 is formed as an image 26 on the second lens 15f by the parabolic mirror 3 and the first lens 10f. The second lens 15f forms a real image 28 on the object region 6 from an image 27 on the first lens 10f. The magnification (M) of the second lens 15f is determined by the ratio between the sectional area of the aperture of the first lens 10f and that of the object region 6. That is, the magnification (M) is almost equal to the ratio between the distance X1 and the distance X2.

It is necessary that the first lens 10f form the real image 26 in the vicinity of the aperture center 23 of the second lens 15f and that the second lens 15f allow a beam which has passed through the aperture center 22 of the first lens 10f to arrive at the center 24 of the object region 6. In view of this necessity, the first lens 10f and the second lens 15f are appropriately decentered. More specifically, the aperture center 23 of the second lens 15f is disposed on an axis of symmetry of the first lens 10f, and the principal point of the second lens 15f is positioned on a straight line extending from the aperture center 22 of the first lens 10f to the center 24 of the object region 6.

The above-described decentering allows each partial luminous flux passing through the first lens 10f and second lens 15f to be utilized with a high efficiency if the real image of the radiation source 2 is smaller than the aperture of the second lens 15f. Accordingly, the configuration and area of each second lens 15 are designed based on the size of the real image 26 formed by the respective first lenses 10, so as to create a large amount of optical loss.

Figure 5:
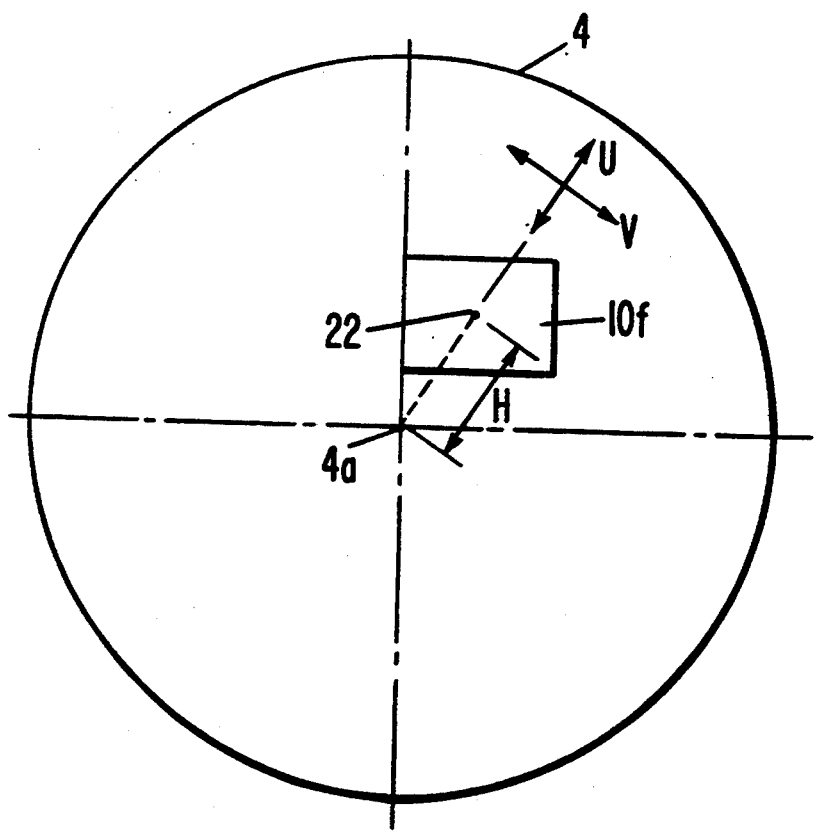
FIG. 5 illustrates a first lens of the first lens array plate shown in FIG. 2.

Referring now to FIG. 5, the height (H) of the first lens 10f will be defined as the distance between the aperture center 22 thereof and the main optical axis 7. Directions orthogonal to each other on the first lens array plate 4 are defined as (U) and (V). The direction (U) corresponds to the radial direction of a circle, the center of which is 4a through which the main optical axis 7 passes, and direction (V) corresponds to a direction tangential to the circle. The direction (U) also corresponds to the direction in which the height (H) of the first lens 10f is measured.

Figure 6:
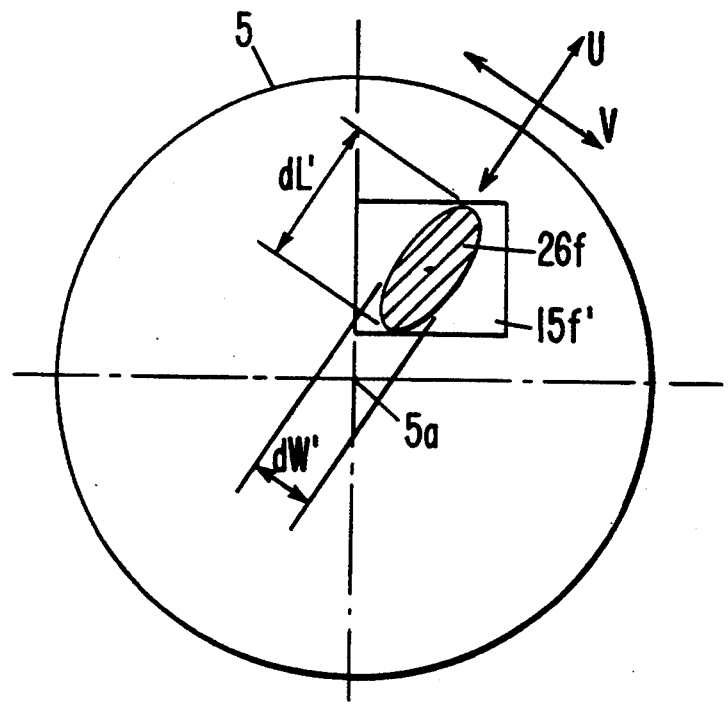
FIG. 6 illustrates a lens of the second lens array plate shown in FIG. 3 and the image of a radiation source formed on the second lens.

Referring next to FIG. 6, the directions U and V shown in FIG. 6 are the directions U and V defined on the first lens array plate of FIG. 5 but projected onto the second lens array 5 in the direction in which light radiates from the first lens 10f.

The lengthwise direction dL' of the image 26f from the radiation source 2 coincides with the radial direction (U), and the widthwise direction dW' of the image 26f coincides with the direction (V) orthogonal to the lengthwise direction dL'. The magnification dL'/dL of the image 26f in the lengthwise direction thereof is KL and the magnification dW'/dW of the image 26f in the widthwise direction thereof is KW.

Figure 7:
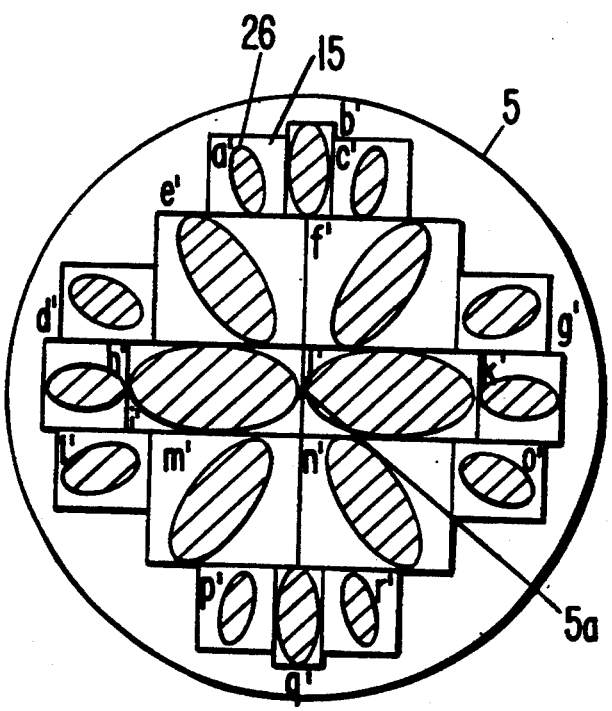
FIG. 7 illustrates the image of the radiation source formed on the second lens array plate shown in FIG. 3.

FIG. 7 shows all of the images 26 formed on the second lens array plate 5. As is apparent from FIG. 7, the images 26 produced by the first lenses 10 located in the vicinity of the main optical axis 7 are relatively large. On the contrary, the images 26 produced by the first lenses 10 remote from the main optical axis 7 are relatively small.

Figure 8:
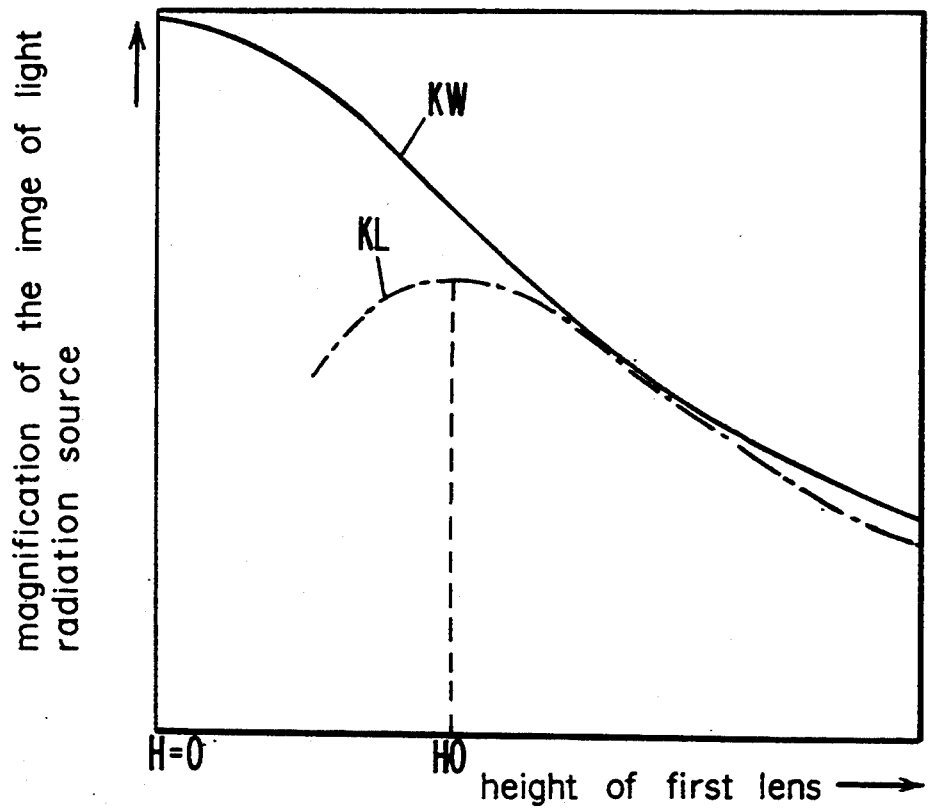
FIG. 8 is a graph showing the correlation between the height (H) of the first lens and the magnifications KL as well as KW of the image of the radiation source, characteristic of the embodiment of the optical illumination system according to the present invention.

FIG. 8 shows an example of the relationship between the height (H) of the first lens 10 and the magnification KL of the image 26 in the lengthwise direction thereof as well as the magnification KW of the image 26 in the widthwise direction thereof. The magnification KL becomes maximum at a height $H_e$ and decreases from there with increases of the height (H).

When the height (H) of the first lens 10f is very small such that the first lens 10f is disposed in the vicinity of the main optical axis 7, the effect on the image 26 is as follows. That is, the apparent length of the radiation source 2 approaches zero, and as a result, the configuration of the image 26 of the radiation source 2 approximates a circle, which is similar to the cross section of the radiation source 2. Therefore, in a region of $H<H_0$, the size of the image 26 is mainly dictated by the value of magnification KW in the widthwise direction.

As is apparent from the above description, comparing the area of the image 26 formed on a second lens paired with a first lens, the height (H) of which is great, and the area of the image 26 formed on a second lens paired with a first lens, the height (H) of which is small, the former is smaller than the latter. Namely, if the height (H) is large, the image is small, and if the height (H) is small, the image is large. In view of this fact, the apertures of second lenses paired with first lenses which are remote from the main optical axis are preferably smaller than the apertures of the second lenses paired with first lenses which are near the main optical axis, although this configuration will produce a slight optical loss.

More specifically, each of the second lenses 15 provides a sufficient aperture for the corresponding portion of the image 26 even though the apertures of the second lenses 15 paired with first lenses 10, the height (H) of which are great, are smaller than the apertures of the second lenses 15 paired with first lenses 10, the height (H) of which are small. In addition, the effective region of the second lens array plate 5 can be minimized by providing respective second lenses 15 having rectangular apertures and by so arranging the lenses in close contact with each other that the overall aperture of the second lens 15 approximates the smallest possible circle. As a result, the optical illumination system of the present invention provides illuminating light having a high degree of brightness uniformity and forming a small angle with the main optical axis by efficiently utilizing light radiating from the light source.

Each of the second lenses 15 indicated by symbols e', f', m', and n' shown in FIG. 7 has a greater aperture than is required for the corresponding portion of the image 26 so that the second lenses 15e', f', m', and n' can contact the adjacent second lenses 15. However, each of the second lenses 15e', f', m', and n' need not be rectangular so that, in conformity with the configuration of the image 26, these second lenses will not have substantial regions in which the image 26 would not be formed.

Figure 9:
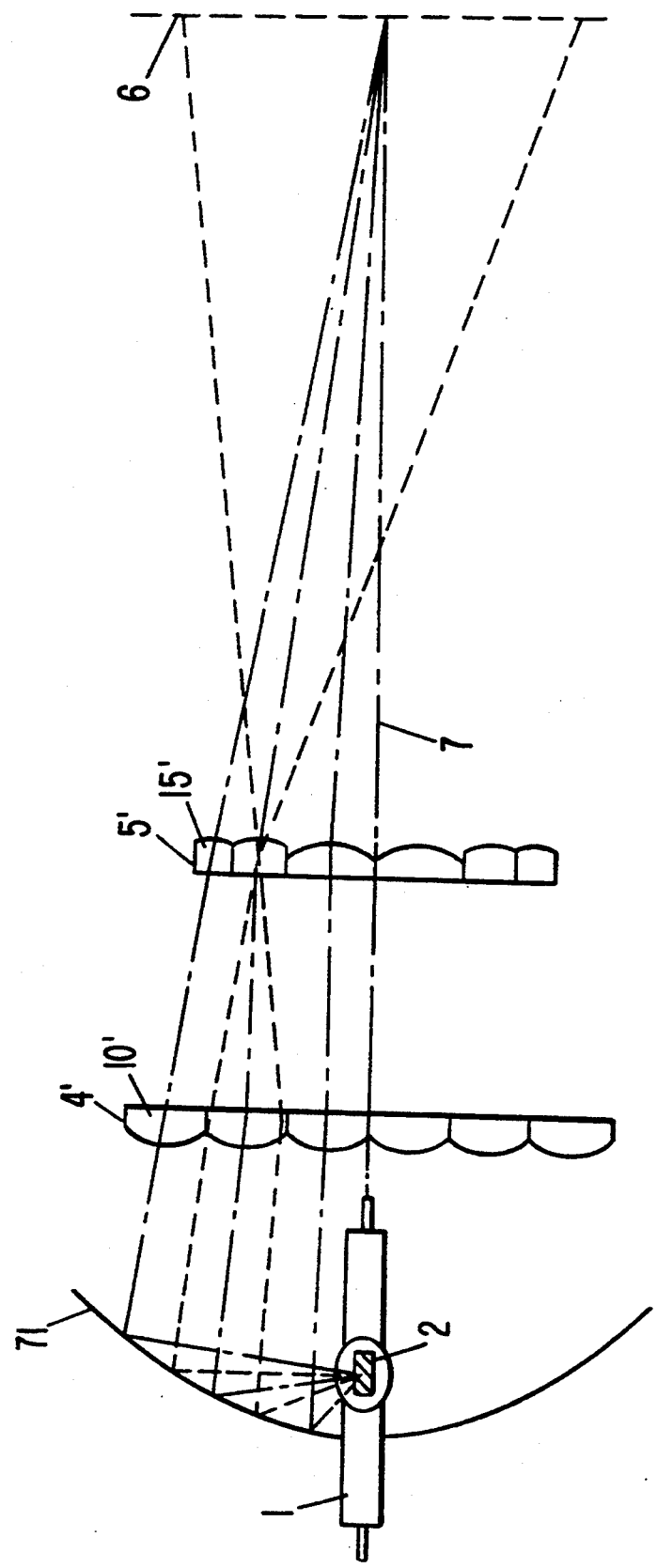
FIG. 9 is a schematic diagram of another embodiment of an optical illumination system according to the present invention.

In the first embodiment of the optical illumination system according to the present invention, the concave mirror is not necessarily a parabolic mirror. FIG. 9 shows an embodiment in which an ellipsoidal mirror is used as the concave mirror 71. The curvature, decentering, and configuration and area of the aperture of the first lenses 10' and those of the second lenses 15' are appropriately determined based on the configuration and area of the ellipsoidal mirror 71. In this example, the second lenses 15' are arranged in close contact with each other by appropriately differentiating the configurations and areas of the apertures of the respective second lens 15' from each other according to the sectional configuration and area of a partial luminous flux incident on each second lens 15'. As a result, an effect similar to that of the first embodiment can be obtained.

FIG. 10 shows an embodiment in which beams radiating from the radiation source 2 are condensed by a condenser lens 72 and a spherical mirror 73. In principle, if the condenser lens 72 has a sine characteristic, the luminous flux will have a small degree of brightness nonuniformity. If beams radiating from the radiation source 2 are to be condensed with a high efficiency, the f-number of the condenser lens 72 must be small and thus it is difficult for the condenser lens 72 to have a sine characteristic. Similarly to the first embodiment, in this example, the second lenses 15" are arranged in close contact with each other by appropriately differentiating the aperture configurations and areas of the second lenses 15" from each other. In this manner, an effect similar to the first embodiment can be obtained.

In the embodiments shown in FIGS. 9 and 10, luminous fluxes which are incident on the first lens array plate in the vicinity of the main optical axis are bright while those which are incident a portion of the first lens array plate remote from the main optical axis are dark, similarly to the embodiment shown in FIG. 1 in which the parabolic mirror is used. In these cases, the greater the height (H) of the first lens, the smaller the image of the radiation source formed by the first lens. Accordingly, the apertures of second lenses paired with first lenses, the height (H) of which are great, are smaller than the apertures of the second lenses paired with first lenses, the height (H) of which are small. In addition, the second lenses are disposed in close contact with each other. This embodiment efficiently utilizes beams radiating from the light source and provides illuminating light which forms a small angle with the main optical axis.

In order for beams radiating from the radiation source to be incident on the first lens array plate with a high efficiency, it is advantageous to use a concave mirror such as a parabolic mirror or an ellipsoidal mirror having a solid angle large enough to favorably condense beams. In using such a concave mirror, the direction of the major axis of the radiation source is set to be incident with the direction of the optical axis of the concave mirror. As a result, luminous fluxes are symmetrical about the optical axis. Therefore, the first and second lens array plates can be easily designed.

In the above-described embodiments, each first lens consists of a plano-convex lens with the convex face thereof opposed to the light source, because lens array plates of plano-convex lenses can be mass-produced easily at a low cost. Other objects of the present invention can be attained with such lens array plates. For instance, because the convex faces of the first lenses 10 are opposed to the parabolic mirror 3 which reflects the beams parallel to each other, the generation of aberrations can be prevented and each partial luminous flux can be efficiently guided to the apertures of the second lenses 15 paired with the first lenses 10.

The configuration of the lens array plate of the optical illumination system contributes to a low cost and mass-producibility using a conventional press molding process. In arranging decentered lenses or lenses having different-sized apertures, it is important that the heights of adjacent lenses do not differ greatly from each other because the influence of the difference in the lens heights at the boundary between adjacent lenses cannot be ignored. If the boundary between the adjacent lenses is enlarged to reduce the difference between the heights of adjacent lenses, the optical loss at the boundary increases.

Figure 11A:
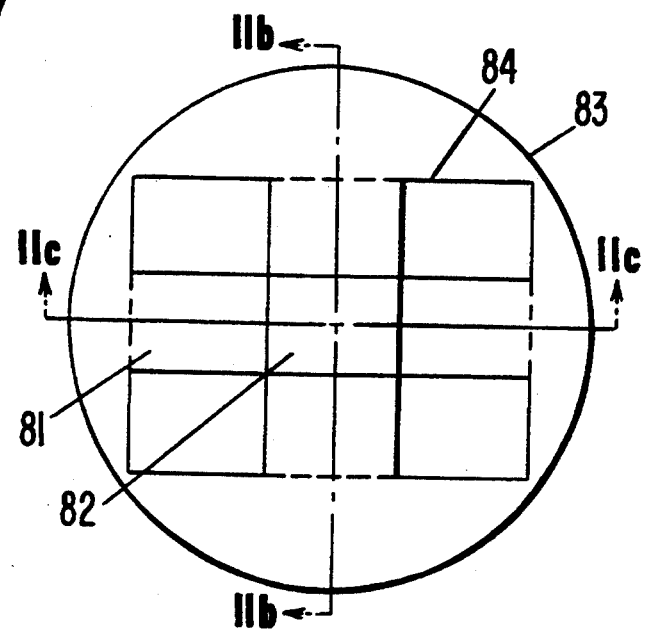
FIGS. 11a to 11c illustrate another lens array plate of the present invention.
Figure 11B:
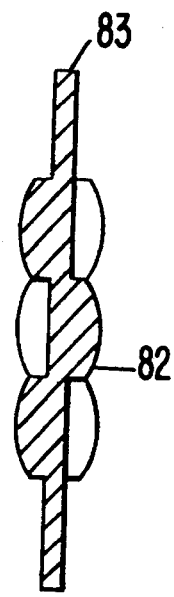
Figure 11C:
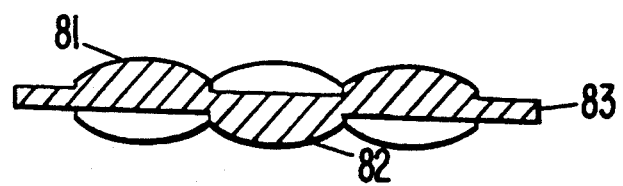

FIG. 11 shows an example of a first lens array plate formed in consideration of the above-described problem. Referring to FIGS. 11b and 11c, in the first lens array plate 83, the convex surfaces of first lenses 81 and 82 adjacent to each other are formed on opposite sides of a substrate of the first lens array plate 83. In this manner, convex surfaces of the first lenses are formed on the substrate alternately in forward and rearward directions.

This first lens array plate facilitates the manufacture of the boundary between adjacent lenses. Since the boundaries between the lenses of the first lens array plate are small, optical loss is minimal. The second lens array plate can have a similar structure because the second lenses of the second lens array plate have apertures of configurations and areas different from each other.

Figure 12:
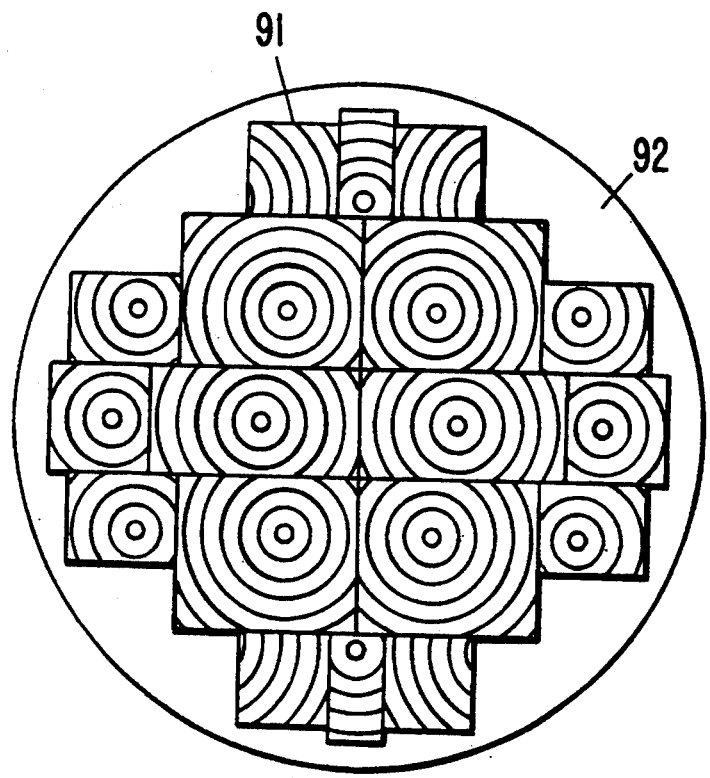
FIG. 12 is a plan view of another second lens array plate of the present invention.

Another form of the second lens array plate will be described with reference to FIG. 12. Fresnel lenses decentered with respect to the aperture thereof are used as second lenses 91 to constitute a second lens array plate 92. As a result, the boundaries between adjacent ones of the lenses 91 can be made nearly equal to each other irrespective of the decentering, and the aperture configurations and areas thereof. Accordingly, there is only a very small area at the boundary between adjacent lenses where no lens is provided, which allows the second lens array plate 92 to be easily formed. In this example, as in the lens array plate shown in FIGS. 11a, 11b and 11c, the second lens array plate can be easily manufactured by providing adjacent convex surfaces of the second lenses 91 alternately on opposite sides of a substrate.

Silicon is known to exhibit superior heat resistance and a comparatively high transparency. The optical illumination system of the present invention has the following advantages when the first lens array plate and/or the second lens array plate is made of silicon rubber having a comparatively high transparency.

As described above, it is difficult and expensive to fabricate a lens array of lenses contacting each other but decentered by different amounts and in different directions. It is also difficult and expensive to manufacture an array of lenses, having apertures of different configurations and areas, with the lenses in contact with each other. A heat-resistant metal mold must be used to press-mold the first or second lens array if the array is to be made of glass. However, it is difficult and expensive to manufacture a metal mold resistant to a high temperature.

Therefore, preferably, a mold of a material resistant to only low temperatures is used to form the lens array plate in view of producibility and cost. A known two component liquid silicon rubber that can mostly cure at room temperature is used to fabricate the lens array plate. Even though it is necessary to heat the components of the silicon rubber, approximately 100° C. suffices for starting the curing process. The cured material is stable, heat-resistant, and weather-resistant. For example, KE 106 and KE 108 manufactured by SHIN-ETSU CHEMICAL CO., LTD. can be used. KE 106 is cured under an addition reaction and KE 108 is cured under a condensation reaction.

Due to the use of the silicon rubber, brass, which is inexpensive and easily workable, can be used to form the mold. If the lens array plate is required to have a mirror surface finish, nickel or chrome is preferably plated on the brass mold. Further, a mold can be formed from a lens array plate serving as an original pattern. For example, it is possible to prepare a lens array plate by adhering to each other a plurality of plano-convex lenses and to then form a mold from the lens array plate by using a cst molding process.

In the above-described methods, liquid silicon rubber is injected into the mold and cured. In this manner, the lens array plate can be manufactured with comparative ease and at a low cost. In this case, preferably, a plurality of molds are prepared to mass-produce the lens array plates on a small scale.

In the above-described embodiment, the aperture of each first lens has a configuration similar to the configuration of the object region to be illuminated. This allows the light emitted by the light source to be used with high efficiency. However, the apertures of the first lenses are not limited to having configurations similar to that of the object region.

It is possible to modify the above-described radiation source, concave mirror, first lens, second lens, first lens array plate, and second lens array plate and the positional relationship between them so long as the beams illuminate the object region with the above-described performance. In particular, the surface of the first lens and/or that of the second lens may be aspherical to decrease aberrations.

A halogen lamp or a xenon lamp may be used instead of the metal halide lamp. A metal halide lamp is typically larger than a halogen lamp or a xenon lamp although a metal halide lamp exhibits a superior luminous efficacy and color reproducing property. The larger the radiation source is, the greater is the effect of the optical illumination system according to the present invention. Therefore, the optical illumination system preferably comprises a metal halide lamp.

Figure 13:
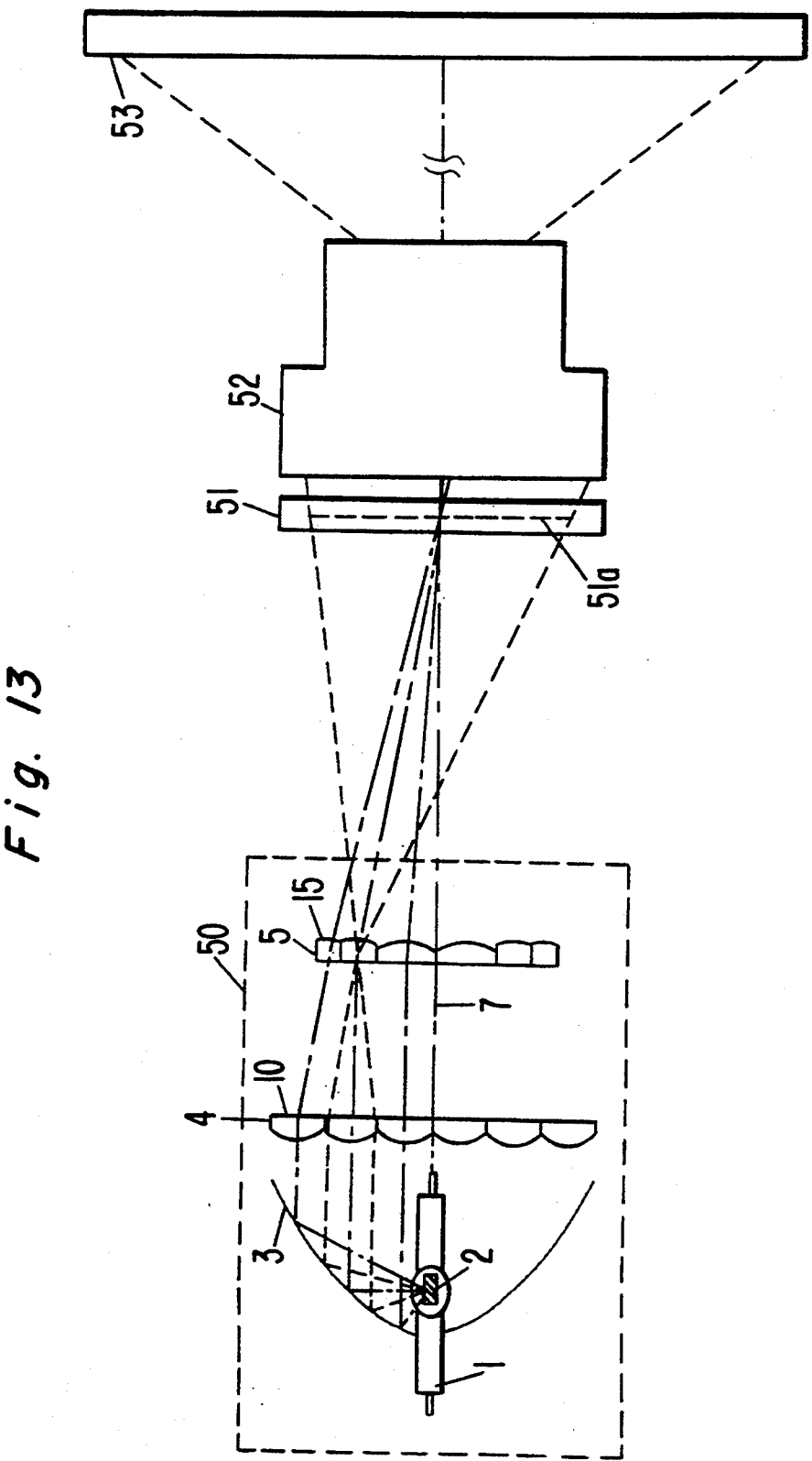
FIG. 13 is a schematic diagram of an embodiment of a projection display apparatus according to the present invention.

A first embodiment of a projection display apparatus using the optical illumination system of the present invention will be described below with reference to FIG. 13. Reference numeral 50 denotes an optical illumination system similar to that of FIG. 1, 51 denotes a liquid crystal panel of twisted nematic crystals, 52 denotes a telocentric projection lens, and 53 denotes a screen.

The optical illumination system 50 illuminates the effective display area 51a of the liquid crystal panel 51 with uniformly bright light. Further, since the effective region of the second lens array plate 5 can be small, the illuminating light which illuminates the liquid crystal panel 51 makes a small angle with the main optical axis. Therefore, the projection display apparatus provides a uniformly bright image while using a projection lens 52 having a large f-number. Moreover, since the illuminating light forms a small angle with the main optical axis, an image can be projected onto the screen 53 with a high contrast and without being adversely influenced by the incident angle. As a result, the projection display apparatus forms an image of a high quality and utilizes the light emitted by the light source very efficiently.

Detailed effects of the optical illumination system projection display apparatus of FIGS. 1 and 13 will now be described.

Experiments were conducted as follows. An active matrix type of nematic liquid crystal panel was used as the liquid crystal panel 51. The length of the diagonal line of the effective display region was 80 mm and the aspect ratio was 4:3. The first lens array plate 4 of the optical illumination system 50 comprised 18 lenses. The magnification (M) of the second lens 15 was 3.2. The wattage of the metal halide lamp 1 was 250 W and the effective length DL of the radiation source 2 was approximately 6 mm, and the effective width DW thereof was approximately 3 mm; the focal length of the parabolic mirror 3 was 12 mm; and the diameter of the aperture of the parabolic mirror 3 was 100 mm.

The length of the diagonal line of the rectangular first lens 10 was 25 mm and the aspect ratio was 4:3. The first lens array plate 4 had a structure as shown in FIG. 2. The distance X1 between the first lens array plate 4 and the second lens array plate 5 was approximately 90 mm, and the distance X2 between the second lens array plate 5 and the liquid crystal panel 51 was approximately 280 mm. The focal length F1 of each first lens 10 was 90 mm, and the focal length F2 of each second lens 15 was 67 mm.

The second lens array plate 5 had a structure as shown in FIG. 3. The apertures of the lenses a' through r' of the second lens 15 had dimensions as shown in Table 1. The horizontal length described in Table 1 corresponds to the horizontal direction of the display region of the liquid crystal panel 51, and the vertical direction corresponds to the vertical direction thereof.

TABLE 1

(example of numerical values of the dimensions of the apertures of the second lenses)

| second lenses | horizontal aperture length | vertical aperture length |
| --- | --- | --- |
| a', c', p', r' | 10 mm | 10 mm |
| b', q' | 6 mm | 12 mm |
| d', g', l', o' | 12 mm | 10 mm |
| e', f', m', n' | 20 mm | 17 mm |
| h', k' | 11 mm | 12 mm |
| i', j' | 23 mm | 12 mm |

The radius of a circle circumscribed about the aperture of the second lens array plate 5 was 35 mm, and a maximum illuminance was 2,500,000 lx at a position immediately forward of the liquid crystal panel 51 when the illuminating angle was approximately 7°. The illuminating angle again refers to the maximum angle formed by the illuminet light with the main optical axis 7 in illuminating the liquid crystal panel 51.

The brightness of an image projected onto the 40-inch screen 53 using the projection lens 52 having an f-number F4 was measured, and the maximum illuminance was approximately 1,000 lx. the degree of brightness uniformity of the projected image was very high.

The ratio of the brightness of the light between the darkest plate and the brightest place was approximately 60%.

Figure 14:
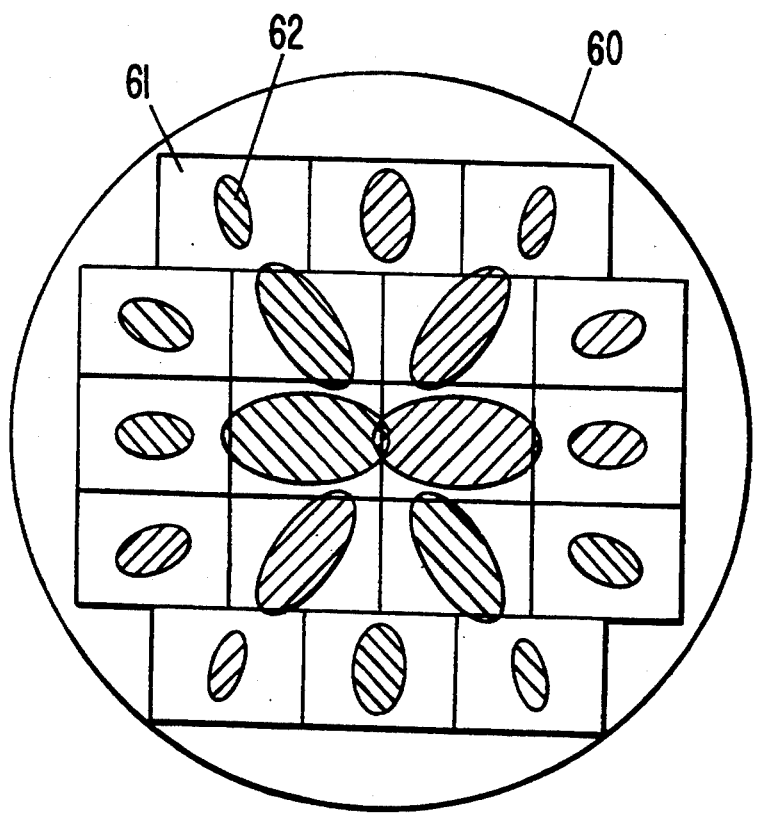
FIG. 14 is a plan view of a conventional second lens array plate, showing the image of a radiation source formed on the second lens array plate.

In order to compare the present invention to the conventional art, a second lens array plate 60 as shown in FIG. 14 was prepared. Each of the second lenses 61 and the first lenses 10 paired therewith had identical rectangular configurations. More specifically, the length of the diagonal of the second lens 61 was 25 mm and the aspect ratio was 4:3. The second lenses 61 were arranged similarly to the first lenses 10. Specifically, the first lens array plate had the same structure as that shown in FIG. 2. Each of the first lenses was not decentered and the focal lengths thereof were equal to those of the first lenses 10 shown in FIG. 2. The second lenses 61 were decentered by amounts approximate to allow the second lenses to superimpose the partial luminous fluxes on each other. Experiments similar to the above-described experiment were conducted by using these first and second lens array plates along with the above-described lamp, parabolic mirror, and liquid crystal panel.

The radius of a circle circumscribed about the apertures of the second lenses 61 of the second lens array plate 60 was 45 mm and the illuminating angle was approximately 9°. The illuminance of beams passing through the second lenses 61 was 2,300,000 lx on the liquid crystal panel 51. Of the image 62 of the radiation source formed on the second lens array plate 60, the part thereof disposed in the vicinity of the main optical axis 7 was greater than the aperture of the second lens 61 through which the luminous flux corresponding to the part of the image 62 passed. That is, an optical loss occurred. FIG. 14 illustrates the image 62 of the radiation source observed on the respective second lenses 61.

The brightness of the image projected onto the 40-inch screen 53 by a projection lens having an f-number F3 was measured, and the maximum illuminance was approximately 900 lx on the screen 53. When a projection lens having an f-number of F4 was used, the maximum illuminance of the image on the screen 53 was approximately 600 lx.

It was confirmed that the optical illumination system of the present invention utilized beams emitted by the light source to form illuminating light having a high degree of brightness uniformity and forming a small angle with the optical axis. In addition, it was also confirmed that the projection display apparatus provided a uniformly bright image without generating optical loss despite using a projection lens having a large f-number. It was also confirmed that when the liquid crystal panel was used as a display, an image having a higher contrast could be obtained using a projection lens having an f-number of F4 instead of F3.

Another embodiment of a projection display apparatus will now be described below with reference to FIG. 15. Liquid crystal panels 101, 102, and 103 corresponding to the three primary colors R, G, and B, respectively, are used to constitute a full color type of projection display apparatus. The projection display apparatus comprises the metal halide lamp 1, the parabolic mirror 3, the first lens array plate 4, the second lens array plate 5, a cold mirror 104, a UV-IR cut filter 105, color separation dichroic mirrors 106 and 108, field lenses 113, 114, and 115, the liquid crystal panels 101, 102, and 103, color combining dichroic mirrors 109 and 110, return mirrors 107 and 111, and a projection lens 112.

The cold mirror 104 reflects visible light and allows unnecessary infrared radiation to pass therethrough. The UV-IR cut filter 105 removes unnecessary infrared radiation and ultraviolet rays from light. The spectral characteristics of the color separation dichroic mirrors 106 and 108 are appropriately designed to separate the illuminating light into the three primary colors R, G, and B. The illuminating light of the three primary colors illuminates the liquid crystal panels 101, 102, and 103 driven by video signals corresponding to the three primary colors R, G, and B. The optical images of the three primary colors R, G, and B formed on the liquid crystal panels 101, 102, and 103, respectively, are combined by the color combining dichroic mirrors 109 and 110 and an enlarged color image is projected onto a screen. The field lenses 113, 114, and 115 are used so that the illuminating light will be incident on the entrance pupil of the projection lens 112.

Figure 15:
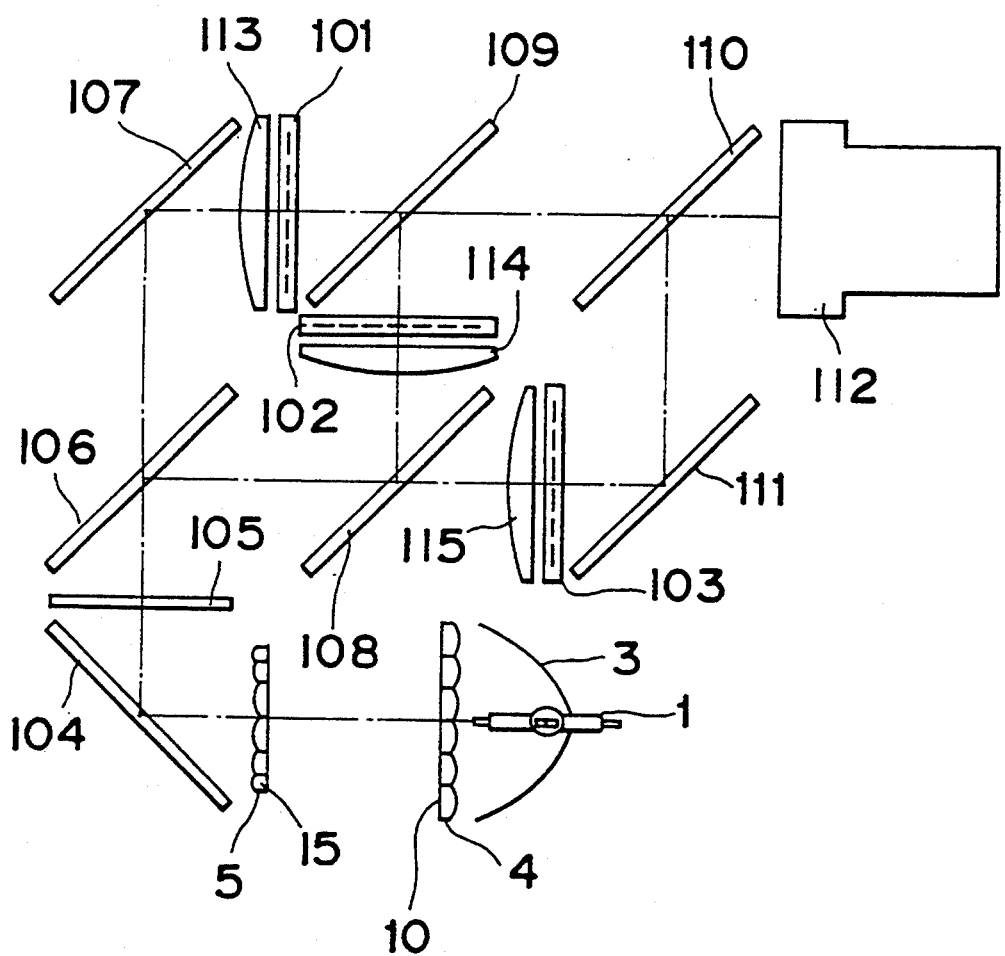
FIG. 15 is a schematic diagram of another embodiment of a projection display apparatus according to the present invention.

The optical illumination system of FIG. 15 utilizes beams emitted by the light source to form an image uniformly bright to a high extent with illuminating light which forms a small angle with the optical axis. Therefore, the projection lens 112 can have a large f-number. As a result, the projection display apparatus is compact and forms a high quality image, uniformly bright to a high extent, on the screen.

In the projection display apparatus of FIG. 15, the lengths of the following three optical paths lengths are equal to each other: the length of the optical path between the send lens array plate 5 and the liquid crystal panel 101, the optical path between the second lens array plate 5 and the liquid crystal panel 102, and the optical path between the second lens array plate 5 and the liquid crystal panel 103. This causes the three liquid crystal panels 101, 102, and 103, corresponding to the three primary colors, to be illuminated under the same conditions using only one lamp, one concave mirror, one first lens array plate, and one second lens array plate.

Figure 16:
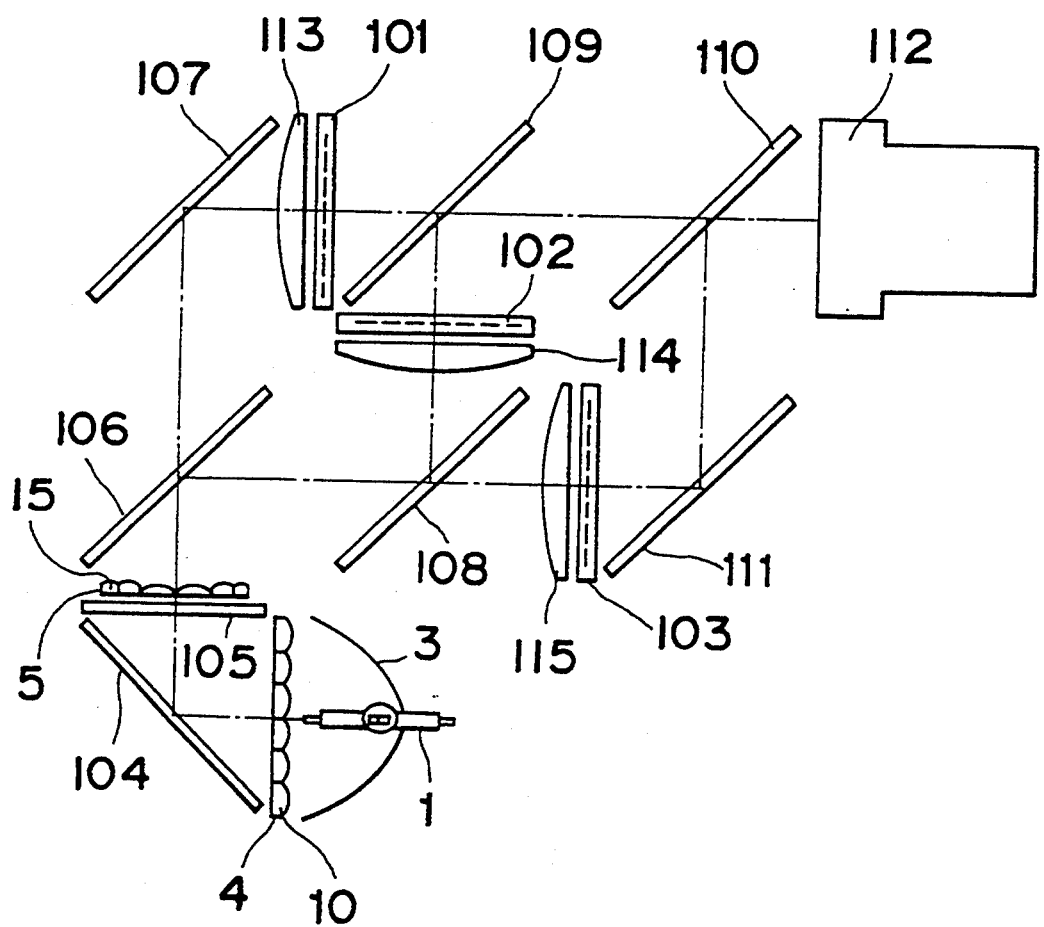
FIG. 16 is a schematic diagram of still another embodiment of a projection display apparatus according to the present invention.

The projection display apparatus may have the structure shown in FIG. 16 in which the cold mirror 104 is provided in the optical path between the first lens array plate 4 and the second lens array plate 5. As a result, the projection display apparatus is more compact.

Figure 17:
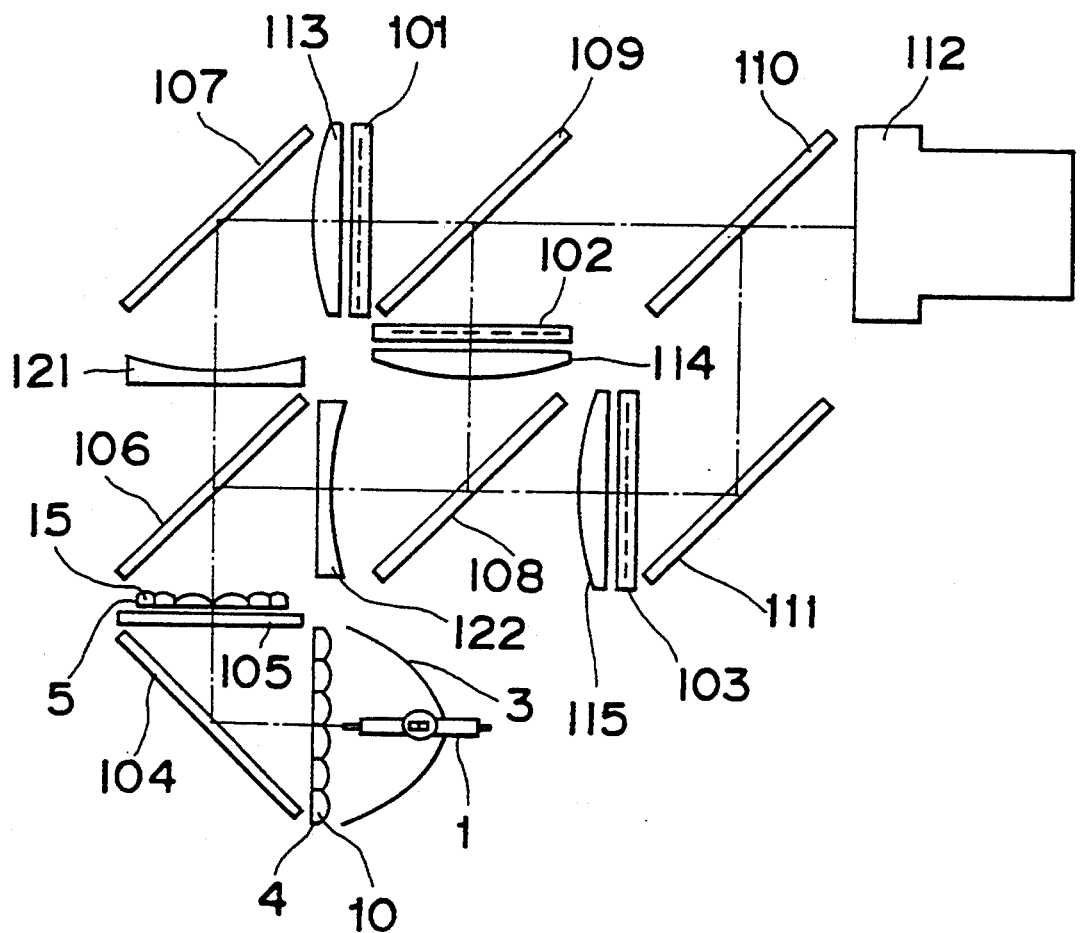
FIG. 17 is a schematic diagram of yet another embodiment of a projection display apparatus according to the present invention.
Figure 18:
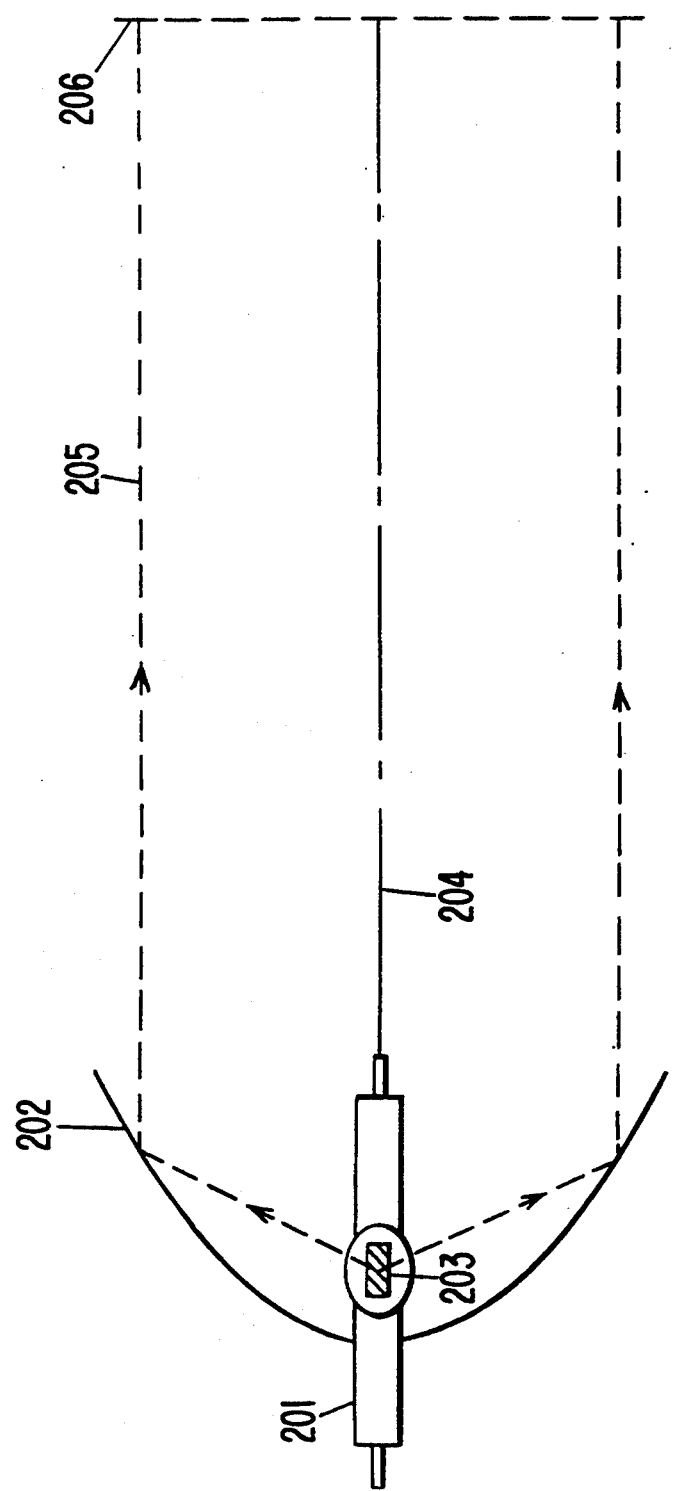
FIG. 18 is a schematic diagram of a conventional optical illumination system.
Figure 19:
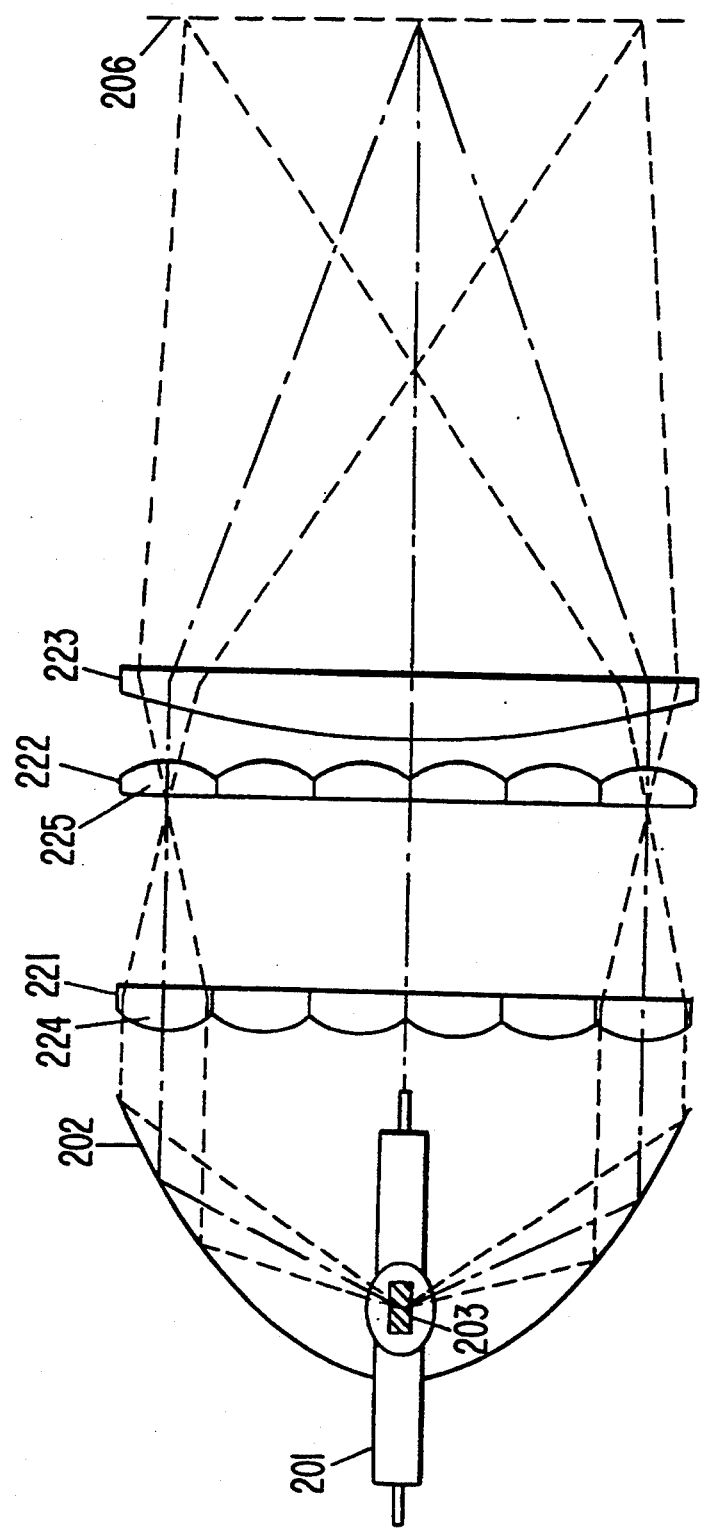
FIG. 19 is a schematic diagram of another conventional optical illumination system.

Another embodiment of the projection display apparatus will be described below with reference to FIG. 17. The projection display apparatus includes concave lenses 121 and 122 in addition to the components shown in FIG. 16. The concave lenses 121 and 122 are positioned between the second lens array plate 5 and the liquid crystal panels 101, 102, and 103, respectively. The function of the concave lenses 121 and 122 is described below.

The length of the optical path between the second lens array plate 5 and the liquid crystal panels 101, 102, and 103 is determined by the space in which two of the dichroic mirrors 106 and 108 and the return mirror 107 can be provided. If this space is longer than necessary, the optical system becomes unnecessarily large. Preferably, the optical path between the first lens array plate 4 and the second lens array plate 5 must have a certain length so that the cold mirror 104 can be disposed between the lens array plate. As a result, there is a limitation on the ratio of the effective display region of the liquid crystal panel to the sectional area of the aperture of the first lens, i.e. there is a limitation on the magnification (M) of the second lens.

Referring to FIG. 4, the magnification (M) of the second lens is determined by the ratio between the length of the optical path X2 and the length of the optical path X1, that is, $M = X2/X1$. If the aperture of the concave mirror 3 is great, a compact optical system cannot be attained. Thus, the number of the first lenses 10 that can be used is limited. However, it is necessary to use a large number of the first lenses to form an image uniformly bright to a high extent. That is, a limitation on the number of the first lenses that can be used causes a big problem.

The use of the concave lenses 121 and 122 allows for a large number of the first lenses to be used. This is because the position of the principal point of the incident side of the second lens can be moved toward the first lens due to the provision of the concave lenses 121 and 122 positioned between the second lens and the liquid crystal panels. That is, with reference to FIG. 4, the length X1 of the optical path can be shortened, and the length of X2 of the optical path can be correspondingly elongated, respectively. Consequently, the projection display apparatus is compact and yet forms an image uniformly bright to a high extent.

The above-described embodiments employ a liquid crystal panel but any element capable of spatially modulating illuminating light will provide a similar effect and is thus acceptable.

As is apparent from the foregoing description, the optical illumination system according to the present invention utilizes beams radiating from the light source with high efficiency to provide illuminating light uniformly bright to a high extent and forming a small angle with the main optical axis. The projection display apparatus using the optical illumination system is compact and provides an image uniformly bright to a high extent even though the projection display apparatus includes a projection lens having a large f-number.

Although the present invention has been fully described in connection with the preferred embodiments thereof with reference to the accompanying drawings, it is to be noted that various changes and modifications will become apparent to those skilled in the art. Such changes and modifications are to be understood as included within the scope of the present invention as defined by the appended claims unless they otherwise depart therefrom.

What is claimed is:

1. An optical illumination system comprising: a radiation source; condensing means for converting beams of light radiating from the radiation source into a single luminous flux; a first lens array comprising a plurality of first lenses disposed in a two-dimensional array; and a second lens array comprising a plurality of second lenses disposed in a two-dimensional array and paired with said first lenses, respectively, the first lens array being optically disposed between said condensing means and said second lens array so as to divide the single luminous flux formed by the condensing means into a plurality of partial luminous fluxes of the same number as that of the first lenses, and so that each of the first lenses converges a respective one of the partial luminous fluxes onto an aperture of the second lens paired therewith, each of the second lenses having a magnification which causes the partial luminous fluxes to be magnified onto superimposed finite regions to be illuminated, each of the second lenses having an aperture larger than the cross section of the partial luminous flux converged onto the second lens, the aperture of at least one of the second lenses having a different configuration than that of the aperture of another one of the second lenses, and the effective region of the second lens array, formed by all of the apertures of the second lenses, approximately inscribing a circle.

2. The optical illumination system as defined in claim 1, wherein each of said first lenses has a height (H), said height (H) being the distance between the center of the aperture of the first lens and the optical axis of the condensing means, and for at least some of the second lenses and the first lenses paired therewith, the larger the height (H) of the first lens, the smaller the area of the aperture of the second lens paired with the first lens.

3. The optical illumination system as defined in claim 1, wherein said condensing means consists of a concave mirror, and the radiation source has a major axis substantially coincident with the optical axis of the condensing means.

4. The optical illumination system as defined in claim 1, wherein each of the first lenses consists of a plano-convex lens, the convex surface of which being the incident side thereof.

5. The optical illumination system as defined in claim 1, wherein an optical surface of each of the lenses of at least one of said lens arrays is spherical.

6. The optical illumination system as defined in claim 1, wherein the shape of the aperture of each of the first lenses is substantially similar to the shape of the object finite region to be illuminated.

7. The optical illumination system as defined in claim 1, and further comprising a return mirror disposed on an optical path between the first lens array and the second lens array, and a concave lens disposed on an optical path downstream of the second lens array.

8. The optical illumination system as defined in claim 1, wherein the radiation source consists of a metal halide lamp.

9. An optical illumination system comprising: a radiation source; condensing means for converting beams of light radiation from the radiation source into a single luminous flux; a first lens array comprising a plurality of first lenses disposed in a two-dimensional array; and a second lens array comprising a plurality of second lenses disposed in a two-dimensional array and paired with said first lenses, respectively, the first lens array being optically disposed between said condensing means and said second lens array so as to divide the single luminous flux formed by the condensing means into a plurality of partial luminous fluxes of the same number as that of the first lenses, and so that each of the first lenses converges a respective one of the partial luminous fluxes onto an aperture of the second lens paired therewith, each of the second lenses having a magnification which causes the partial luminous fluxes to be magnified onto superimposed finite regions to be illuminated, at least one of said lens arrays having a substrate, and at least some of the lenses of said one of the lens arrays having convex surfaces, adjacent ones of said convex surfaces in the array being alternately disposed on opposite sides of said substrate.

10. The optical illumination system as defined in claim 9, wherein an optical surface of each of the lenses of at least one of said lens arrays is spherical.

11. The optical illumination system as defined in claim 9, wherein the shape of the aperture of each of the first lenses is substantially similar to the shape of the superimposed object finite regions to be illuminated.

12. An optical illumination system comprising: a radiation source; condensing means for converting beams of light radiating from the radiation source into a single luminous flux; a first lens array comprising a plurality of first lenses disposed in a two-dimensional array; and a second lens array comprising a plurality of second lenses disposed in a two-dimensional array and paired with said first lenses, respectively, the first lens array being optically disposed between said condensing means and said second lens array so as to divide the single luminous flux formed by the condensing means into a plurality of partial luminous fluxes of the same number as that of the first lenses, and so that each of the first lenses converges a respective one of the partial luminous fluxes onto an aperture of the second lens paired therewith, each of the second lenses having a magnification which causes the partial luminous fluxes to be magnified onto superimposed finite regions to be illuminated, and each of said lenses of the second lens array consisting of a Fresnel lens.

13. The optical illumination system as defined in claim 12, wherein second lens array includes a substrate, and the optical surfaces of adjacent ones of the Fresnel lenses in the array being alternately disposed on opposite sides of the substrate.

14. An optical illumination system comprising: a radiation source; condensing means for converting beams of light radiating from the radiation source into a single luminous flux; a first lens array comprising a plurality of first lenses disposed in a two-dimensional array; and a second lens array comprising a plurality of second lenses disposed in a two-dimensional array and paired with said first lenses, respectively, the first lens array being optically disposed between said condensing means and said second lens array so as to divide the single luminous flux formed by the condensing means into a plurality of partial luminous fluxes of the same number as that of the first lenses, and so that each of the first lenses converges a respective one of the partial luminous fluxes onto an aperture of the second lens paired therewith, each of the second lenses having a magnification which causes the partial luminous fluxes to be magnified onto superimposed finite regions to be illuminated, and one of said lens arrays being formed of transparent silicon rubber.

15. A projection display apparatus comprising: an optical illumination system including a radiation source, condensing means for converting beams of light radiating from the radiation source into a single luminous flux, a first lens array comprising a plurality of first lenses disposed in a two-dimensional array, and a second lens array comprising a plurality of second lenses disposed in a two-dimensional array and paired with said first lenses, respectively; and an optical projection system including a light modulator on which an optical image illuminated by said optical illumination system is produced, and optical projection means for enlarging the illuminated optical image on the light modulator and for projecting the enlarged optical image onto a screen, the first lens array being optically disposed between said condensing means and said second lens array so as to divide the single luminous flux formed by the condensing means into a plurality of partial luminous fluxes of the same number as that of the first lenses, and so that each of the first lenses converges a respective one of the partial luminous fluxes onto an aperture of the second lens paired therewith, each of the second lenses having a magnification which causes the partial luminous fluxes to be magnified onto superimposed finite display regions of said light modulator, each of the second lenses having an aperture larger than the cross section of the partial luminous flux converged onto the second lens, the aperture of at least one of the second lenses having a different configuration than that of the aperture of another one of the second lenses, and the effective region of the second lens array, formed by all of the apertures of the second lenses, approximately inscribing a circle.

16. The projection display apparatus as defined in claim 15, wherein said light modulator consists of a liquid crystal panel.

17. A projection display apparatus comprising: radiation source means for radiating beams of light including at least the three primary colors; condensing means for converting the beams of light radiating from the radiation source into a single luminous flux; a first lens array comprising a plurality of first lenses arrayed in two dimensions; a second lens array comprising a plurality of second lenses disposed in a two-dimensional array and paired with said first lenses, respectively; color separating means for separating beams transmitted through the second lens array into beams of light each of a respective one of the three primary colors; three light modulating means for forming three optical images each corresponding to a respective one of the three primary colors; optical projection means for synthesizing and enlarging the optical images formed on the three light modulating means and for projecting the enlarged synthesized optical image onto a screen; and a mirror disposed in an optical path between said first lens array and said second lens array, the lengths of the optical paths between the second lens array and each of said three light modulating means being equal, the first lens array being optically disposed between said condensing means and said second lens array so as to divide the single luminous flux formed by the condensing means into a plurality of partial luminous fluxes of the same number as that of the first lenses, and so that each of the first lenses converges a respective one of the partial luminous fluxes onto an aperture of the second lens paired therewith, each of the second lenses having a magnification which causes the partial luminous fluxes to be magnified onto superimposed finite display regions of each of the light modulating means, each of the second lenses having an aperture larger than the cross section of the partial luminous flux converged onto the second lens, the aperture of at least one of the second lenses having a different configuration than that of the aperture of another one of the second lenses, and the effective region of the second lens array, formed by all of the apertures of the second lenses, approximately inscribing a circle.

18. The projection display apparatus as defined in claim 17, and further comprising a concave lens disposed in each of the optical paths between the second lens array and the three light modulating means.

* * * * *